Figure 9:
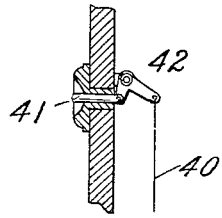

J. F. PORTER, DEC'D.
E. O. PORTER, ADMINISTRATRIX.
ADVERTISING MACHINE.
APPLICATION FILED MAR. 29, 1910.
1,112,656.
Patented Oct. 6, 1914.
5 SHEETS—SHEET 1.
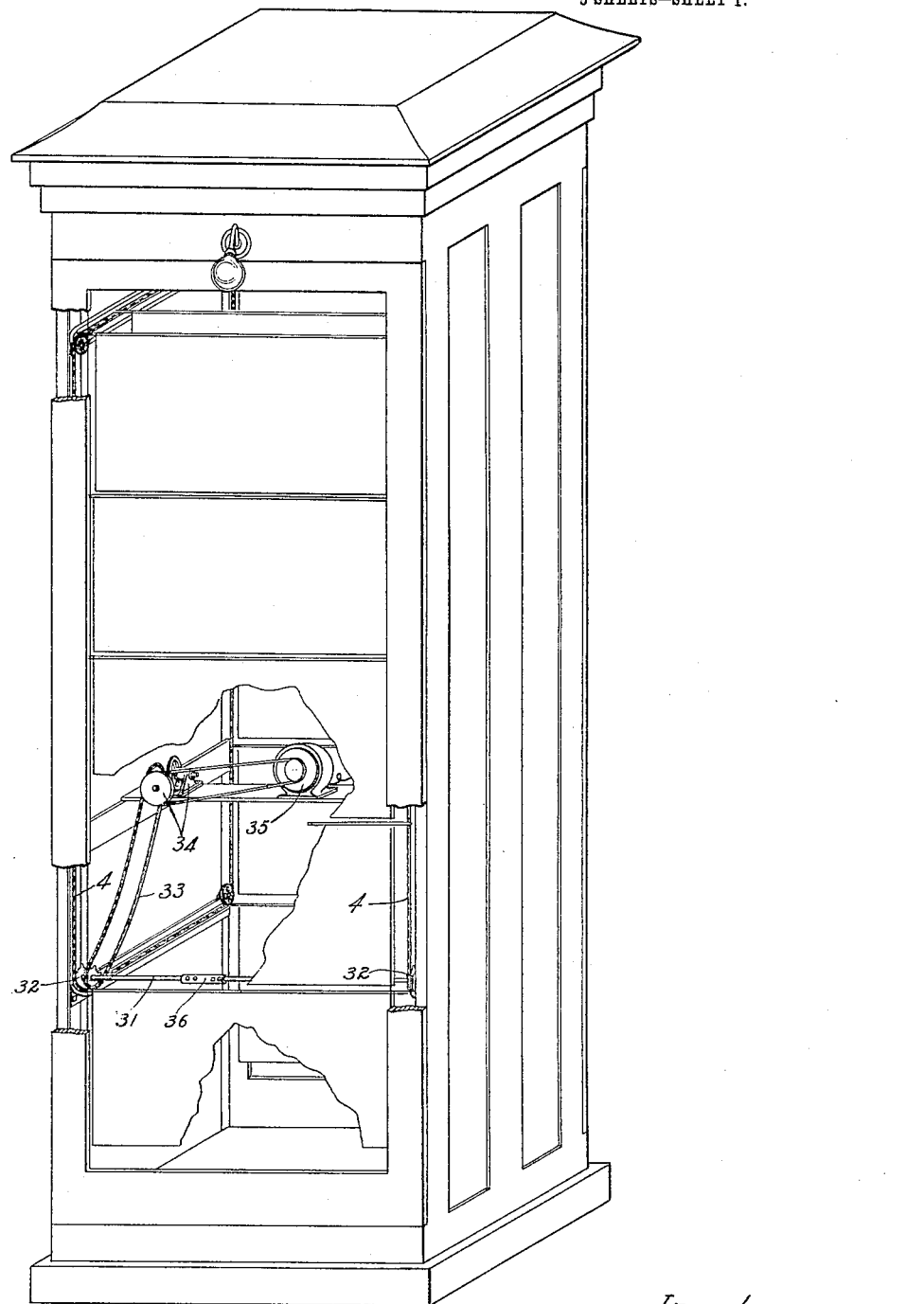
Fig. 1.

J. F. PORTER, DEC'D.
E. O. PORTER, ADMINISTRATRIX.
ADVERTISING MACHINE.
APPLICATION FILED MAR. 29, 1910.
1,112,656.
Patented Oct. 6, 1914.
5 SHEETS—SHEET 2.
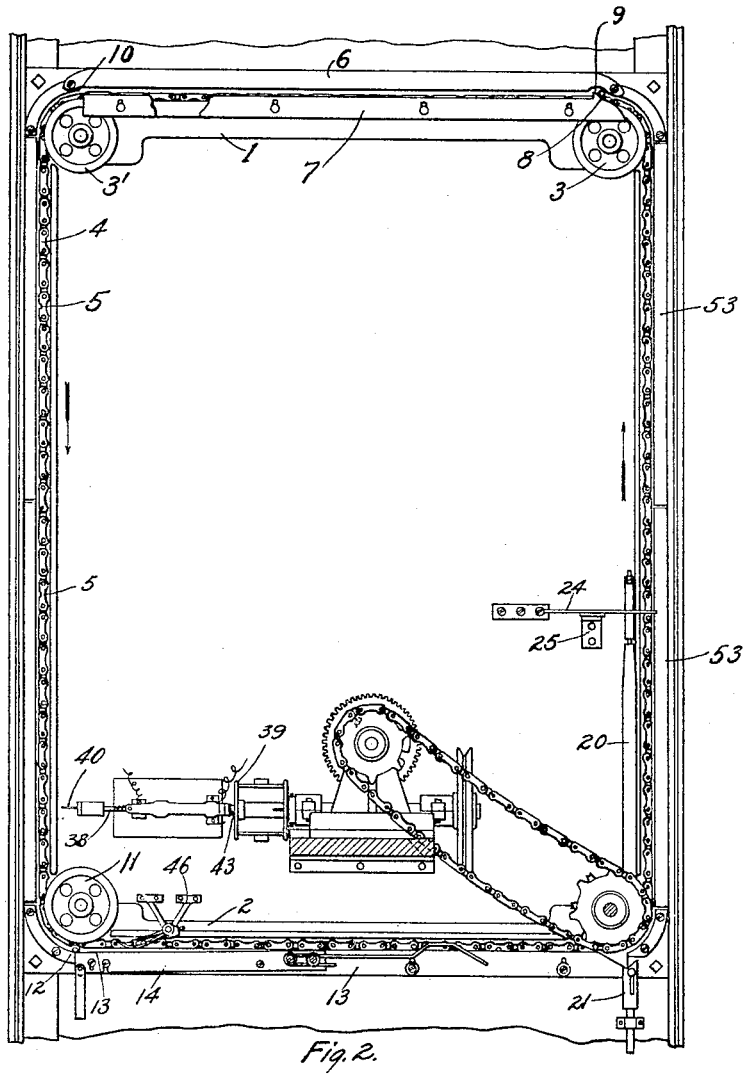
Fig. 2.
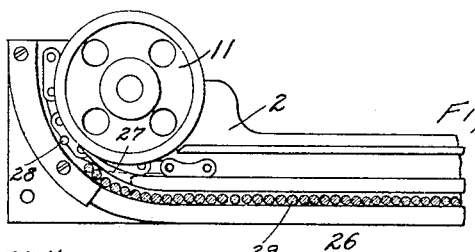
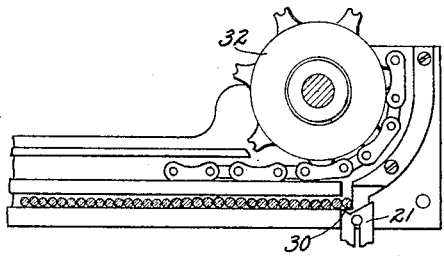
Fig. 6.
Witnesses.
Inventor.
John Frank Porter.
Attorney.

J. F. PORTER, DEC'D.
E. O. PORTER, ADMINISTRATRIX.
ADVERTISING MACHINE.
APPLICATION FILED MAR. 29, 1910.

1,112,656.

Patented Oct. 6, 1914.
5 SHEETS—SHEET 3.

Witnesses.

Inventor.
John Frank Porter.
By his Attorney.

J. F. PORTER, DEC'D.
E. O. PORTER, ADMINISTRATRIX.
ADVERTISING MACHINE.
APPLICATION FILED MAR. 29, 1910.
1,112,656.
Patented Oct. 6, 1914.
5 SHEETS—SHEET 4.
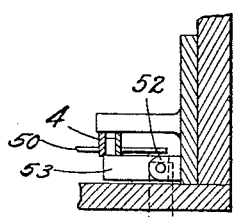
Fig. 14.
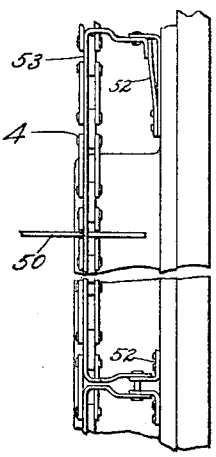
Fig. 15.
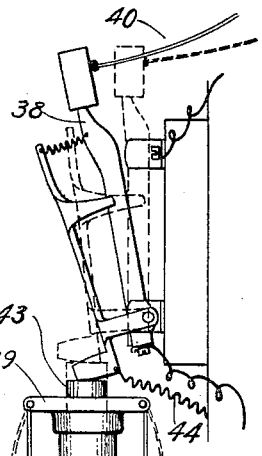
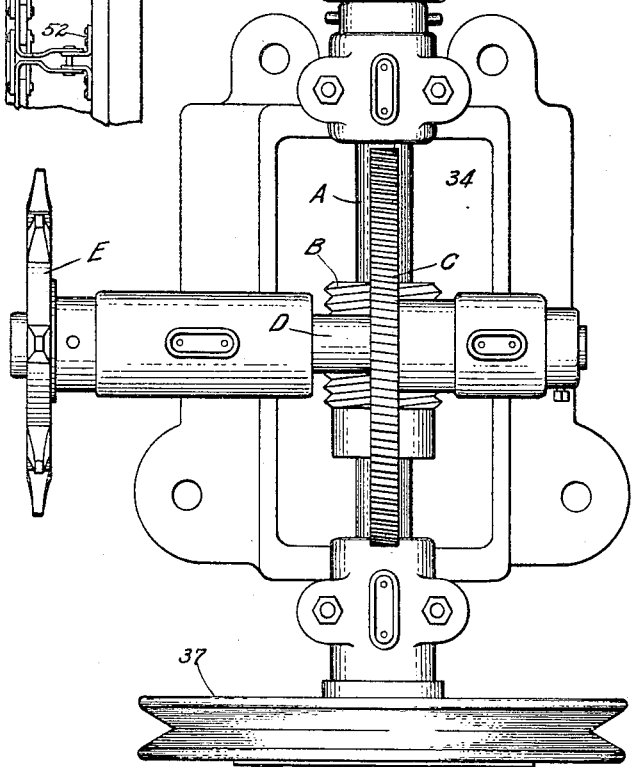
Fig. 8.
Witnesses
Inventor.
John Frank Porter.
Attorney.

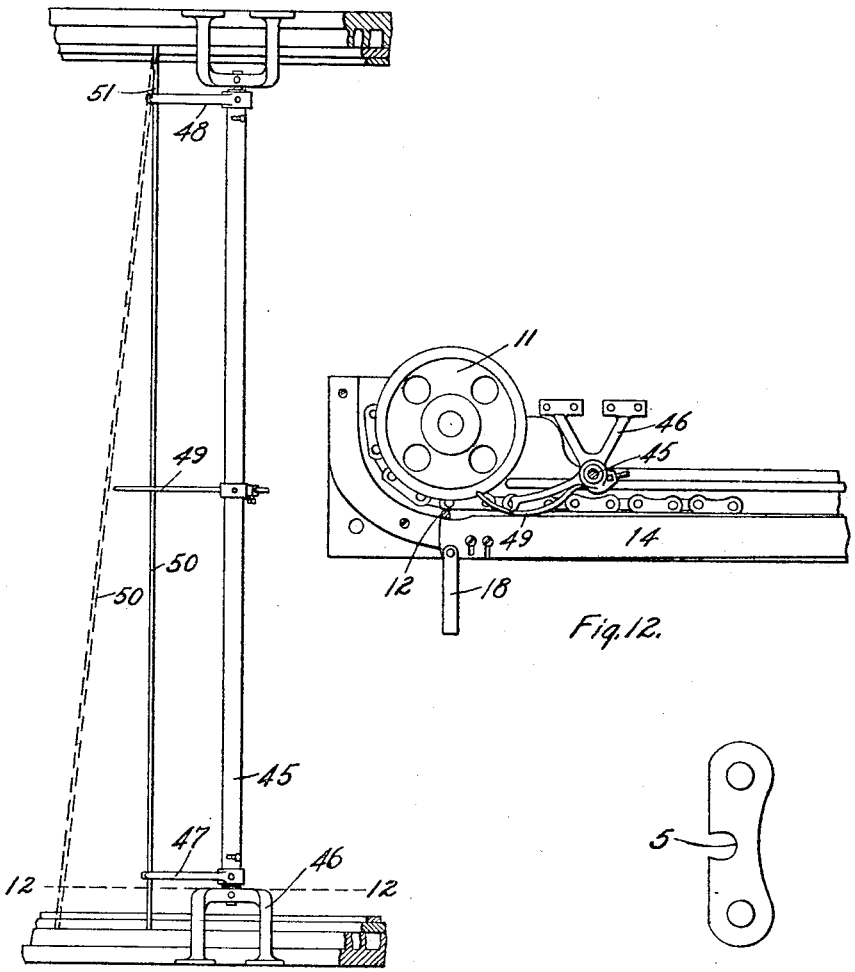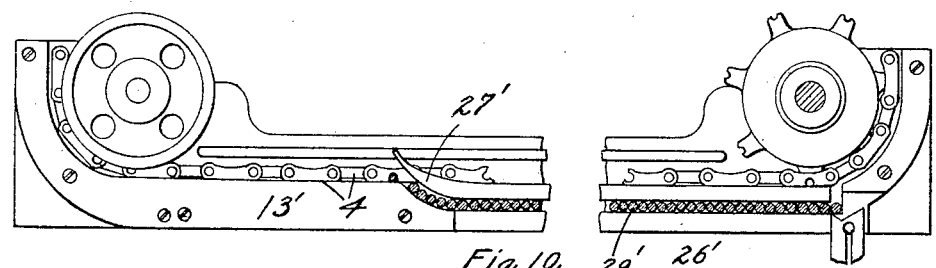

UNITED STATES PATENT OFFICE.

JOHN FRANK PORTER, OF PORTLAND, OREGON; ELSIE O. PORTER ADMINISTRATRIX OF SAID JOHN FRANK PORTER, DECEASED.

ADVERTISING-MACHINE.

1,112,656.  Specification of Letters Patent.  Patented Oct. 6, 1914.

Application filed March 29, 1910. Serial No. 552,248.

*To all whom it may concern:*

Be it known that I, JOHN FRANK PORTER, a citizen of the United States, residing in the city of Portland, county of Multnomah, and State of Oregon, have invented certain new and useful Improvements in Advertising-Machines, of which the following is a specification.

My invention relates to advertising machines, and more particularly to a machine provided with one or more display windows or fronts, and with a traveling conveyer adapted to receive and successively move to said windows or fronts the advertising cards and the like placed within the machine.

Among the salient objects of my machine are,—to provide an advertising machine of the character referred to in which there are a plurality of display windows or fronts with a traveling conveyer moving adjacent thereto and adapted to carry before said windows or fronts advertising cards placed in the machine; to provide in such a machine mechanism whereby some of said cards are intermittently stopped still in display position at different points in their course of travel while the others are moving; to provide such a machine with one or more magazines or storage racks for receiving and holding advertising cards until they are delivered to the conveyer for display; to provide an advertising machine of the character referred to which is so constructed and arranged that it has great capacity for receiving the cards or advertising matter to be displayed before its windows or fronts; to provide in a machine of this character an improved mechanism for automatically delivering said advertising cards to the conveyer and for again depositing them upon the magazines or holding racks; to provide in a machine of the character referred to automatic controlling mechanism for stopping its operation in case of mishap or breakage, and in general, to provide an advertising machine of the character referred to which is simple and practical in its construction and operation, and which is economically and automatically operated and regulated.

The invention will be readily understood from the following description, reference being had to the accompanying drawings, in which,—

Figure 7:
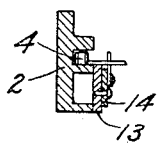
Figures 3, 4:
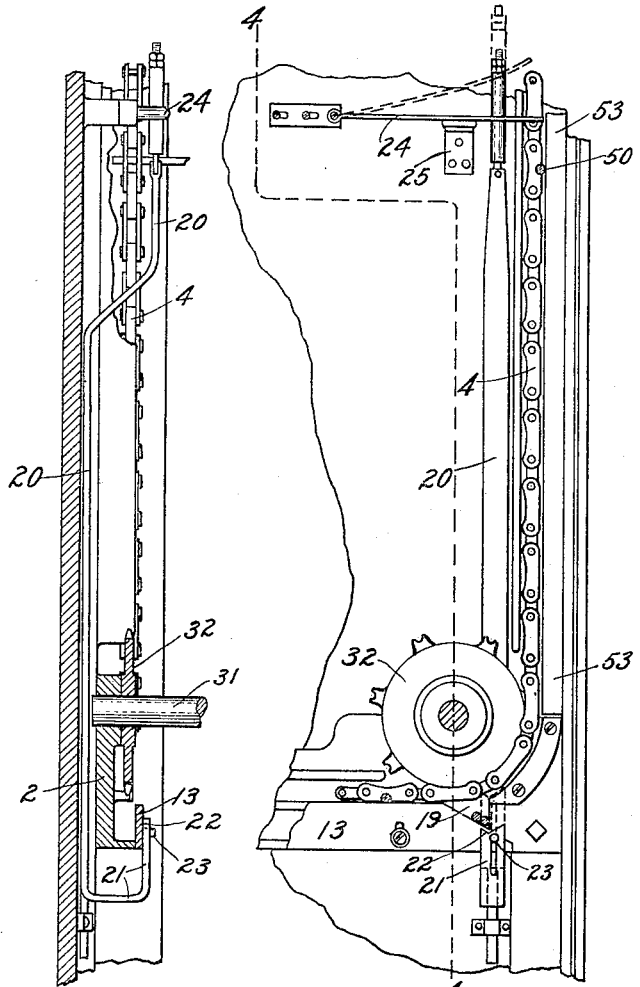
Figure 5:
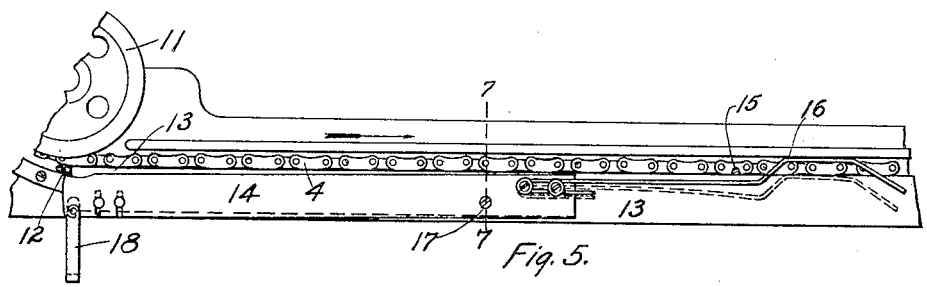

Figure 1 is a perspective view of one of my advertising machines with portions of some of the cards and frame work broken away to show the general mechanism within for operating the machine; Fig. 2 is a side view showing one of the conveyer chains with driving mechanism therefor; Fig. 3 is an enlarged fragmentary view of the lower right-hand corner portion of Fig. 2; Fig. 4 is a vertical sectional view on line 4—4 of Fig. 3; Fig. 5 is an enlarged fragmentary view of the lower left-hand portion of Fig. 2; Fig. 6 is an enlarged view of the lower casting or carrying frame member for the conveyer chain, shown in Figs. 2 and 5, but re-arranged so as to provide a magazine or storage space for the cards beneath the path of the conveyer chain, as indicated; Fig. 7 is a sectional view on the line 7—7, Fig. 5; Fig. 8 is a top plan view of a gear mechanism through which the conveyer chain is driven from the motor, with attached controlling mechanism for breaking the circuit when operated by electricity; Fig. 9 is a fragmentary sectional view showing a push button through the wall of the cabinet, with connections leading to the mechanism for closing the switch and starting the motor; Fig. 10 is a view similar to Fig. 6, but showing a modified arrangement for the lower rack, when it is desired to use only a portion of the length thereof for storage purposes; Fig. 11 is a plan view of a stopping device for causing the controlling mechanism to operate when one of the rods, for any reason, fails to be picked up at both ends; Fig. 12 is an end view of what is shown in Fig. 11; Fig. 13 is an enlarged detail of one of the carrying links of the conveyer chains which carry the cards or advertising matter. Fig. 14 is a fragmentary sectional view of a retaining device for preventing the card rods from coming out of their notches in the chain when the doors of the cabinet are opened; and Fig. 15 is a fragmentary face view thereof.

Referring now to the drawings and particularly to Fig. 1, it will be seen that the present embodiment of the machine comprises a cabinet having two of its sides, which are opposite each other, open and preferably provided with glass doors or fronts, its other two opposite sides being closed, as with panel side walls. Mounted to travel upon the inside of the closed or panel side walls and opposite each other, are two traveling conveyer chains, adapted to carry the opposite ends of supporting rods upon which are mounted advertising cards or other objects to be displayed at the windows or fronts of the machine. These supporting rods are carried by means of the traveling conveyer chains up one side, across the top, down the other side, across the bottom and thence to the starting point again, displaying the cards mounted thereupon at the open windows or fronts, first at one side and then at the other.

Referring now to Fig. 2, I have shown an inside view of one of the side walls, upon each of which is mounted a pair of castings or carrier frames for the pulleys and conveyer chains. One of these castings, designated 1, is mounted at the top of the side wall, and the other, designated 2, is mounted near the bottom, leaving space below sufficient to display the advertising card which hangs from the conveyer chain. These castings each comprise a flat back portion adapted to be secured to the side wall of the cabinet and are provided at each end with a pulley, as 3—3', over which the conveyer chain, designated 4, passes. Certain links of the chain 4 are provided in their outer edges or faces with notches, as 5, Figs. 2 and 3, within which the ends of the supporting rods for the cards are carried. Mounted upon the inner face of the frame or casting 1, are two plates, 6 and 7, adapted to be adjusted so as to form a slide-way therebetween just large enough to receive the ends of the rods which carry the cards or other objects to be displayed. The upper edge of the plate 7 is a trifle lower than flush with the top of the moving conveyer chain, the top of the chain being just enough above the edge of the plate 7 so that the frictional contact thereof with the rod ends operates to move said rods across the top of the machine from one side to the other without permitting them to drop into the notches in the chain. This operation may be more clearly explained by stating that as the end of a rod is carried upwardly by a notch in the chain, at the right-hand side of Fig. 2, and over the pulley 3, it is carried to a position designated 8, where it is moved out of the notch in the chain by means of an upwardly projecting lug like point 9 on the plate 7, as shown, which also operates to hold the rod end in this position, riding on the moving chain, with its depending card displayed at the top of the display front in a quiet position until another rod and card moves upwardly in front of it and pushes it over the point 9 and into the slide-way between plates 6 and 7, within which it is moved to the opposite side of the machine by the frictional contact with the moving chain. As the rod is moved along to the end of the plate 7, it rests against a shoulder 10 beyond the end of the plate 7, a distance equal to the thickness or diameter of a rod, riding all the while on the moving chain, with its card displayed quietly, said cards having advertising matter on both sides thereof, or two cards being placed back to back. The card is thus supported until the next notch in the chain comes along into which it drops to be carried by the chain downwardly to the lower side of the machine. As the card moves downwardly to the lower side of the machine, being displayed all the way, it passes around a pulley 11, mounted upon that end of the lower frame or casting 2, and finally drops out of the notch in the chain and rests at the point 12, Fig. 2, in a space provided to receive the rod ends at this location. The rod rests against the end of a plate 13 and over the end of a movable or trip plate 14, Figs. 2, 5 and 7. The rod with its card depending, remains supported in this position until the next preceding card, as at 15, Fig. 5, engages a spring member 16 mounted upon the trip plate 14. When this engagement is made, the trip plate 14 is rocked upon its fulcrum at 17, which operates to raise the opposite end thereof and to lift the rod resting over the end thereof, as at 12, upwardly against the chain, holding it there until the next notch in the chain comes along and picks it up. The engaging surface of the spring 16 is of sufficient length so that this will take place, as will be readily understood by reference to Fig. 5. It will be understood, of course, that the distance between the trip point 16 and the point 12 is substantially the same as the space between the notches in the conveyer chain. A depending weight 18 is attached to the end of the trip plate 14 for the purpose of returning it to its normal position to receive the next rod. The rod which is picked up by the chain at the point 12 is carried along until it trips the trip plate, through the spring 16, which operates to lift another rod at 12 into position to be picked up by the chain. As the rod passes over the trip spring 16, it is carried along upon the top of the plate 13, by the chain 4, Figs. 2 and 3, until it reaches the end thereof where it moves downwardly into a recess 19, provided to receive it, as indicated in Fig. 3. Here it rests with its card quietly displayed until again lifted into position to be picked up by the moving conveyer chain. This pick-up mechanism I will now describe.

20 designates a trip lever, Figs. 3 and 4, the lower end of which is turned upwardly, as at 21, the end thereof being provided with a notch 22 adapted to lift the rods upwardly against the chain to be picked up by the next notch therein. The lower upturned end 21 of said trip lever is provided with a slot and pin guide and support, as indicated at 23. The upper end of said trip lever 20 is carried upwardly, as indicated in Figs. 2 and 3, and outwardly beyond the chain, as indicated in Fig. 4, and is attached at its upper end to the free end of a hinged arm 24, which is adjustably mounted upon the wall of the cabinet so as to extend along side of the chain 4 and into the path of the card rods carried thereby, as seen in Fig. 3. As a card rod is carried upwardly by the chain, it engages the end of said arm member 24 and lifts it. This in turn raises the trip lever 20, which operates through its lower end 21 to pick up one of the card rods and lift it upwardly against the chain, holding it there until a notch in the chain picks it up and carries it upwardly in front of the display window of the cabinet to the recess at 8, where it is retained until the next rod moves it over the point 9. 25 designates a support for the member 24. The arm 24 is yieldingly attached to the upper end of the trip lever 20, preferably between two yielding members mounted over the upper end of the lever 20 and held in place by adjusting nuts, as shown, Fig. 3.

The space between the plates 6 and 7, Fig. 2, will carry as many rods as will lie side by side therein. If the space is full, as one rod is moved over the point at 9, a rod at the other end of the space is being picked up by the chain and carried around the course.

It will be understood that the opposite sides of the cabinet and conveyer mechanism are alike and that both ends of the card rods are moved together.

Under the present arrangement and operation, the rods and cards as they come to the four corners of the machine, come to a dead stop until the next rod comes along and moves against it and starts it onward in its course. In order to insert additional cards, they may be readily placed in the space between the plates 6 and 7 until that space is filled, or they may be placed in any empty notches in the chain as it moves along the front of the machine, the doors having been removed or opened.

I will now describe a modification of the lower casting or frame 2, whereby a magazine or storage rack at the lower side of the machine is provided for card rods, when space between plates 6 and 7 is full.

Referring to Figs. 2, 6 and 7, plate 13 and the trip plate 14 are removed and there is inserted and secured edgewise in the space beneath the chain, a dividing strip or piece designated 26, having one end thereof turned upwardly and made pointed, as indicated at 27, Fig. 6. The point of this dividing strip rests along side of the pulley 11 in such position that when a rod is moving downwardly in the notch, as at 28, it is, by the point of the dividing strip 26, caused to move out of the notch in the chain and to pass into a receiving space 29 beneath the dividing strip 26. This space is not used until the space in the upper frame between the plates 6 and 7 is full. When this upper space is full, then the rods are transferred to the space 29 in the lower part of the machine, and it is filled full. When this space 29 is full and the rod is moved into the entrance thereof, a rod at the other end thereof is pushed into position, as at 30, to be raised by the lower end 21 of the trip lever 20, into contact with the chain, whereby to be picked up in the next notch in the chain, as will be readily understood by reference to Fig. 6, the operation being the same as that described for Figs. 2 and 3, and the travel of the rods from this point is the same as before described. Additional rods may now be placed in the upper magazine between plates 6 and 7 until the machine is loaded.

Referring to Fig. 10, I have reduced the capacity of the lower magazine by shortening the length of the dividing strip, as at 26'. By using a shorter plate, as at 13', and a shorter dividing strip 26', and allowing the turned up end thereof 27' to rest along side said chain, as indicated in Fig. 10, so that as a rod is moved along upon the top of the plate 13' by the chain, it will, after having been carried partially across the lower portion of the machine, be diverted by the point 27' into the storage space 29' in the same manner, as described in connection with Fig. 6.

The conveyer chains are driven from a shaft (as 31, Fig. 1) upon each end of which is a small sprocket wheel, as 32, over which pass the two conveyer chains 4—4, the shaft 31 being driven by a driving chain 33 from a gear mechanism, designated as a whole 34, shown in Fig. 8. This gear mechanism is in turn driven from a motor designated as 35. The shaft 31 is preferably made in sections, joined together, as at 36, whereby to facilitate taking the machine apart.

The motor for driving the machine may be of any type, but I have provided the gear mechanism 34 for automatically controlling it and for directly driving the conveyer chains. I will now describe this gear mechanism, reference being had to Fig. 8. Driving connection between the motor 35 and the gear mechanism 34 is made through a pulley, as 37, mounted upon the gear mechanism, with a belt running thereto from a pulley upon the motor, as clearly indicated in Fig. 1. Said gear mechanism is provided with a switch mechanism, as at 38, adapted to be actuated through a revolving governor, as 39. The switch 38 is connected into the circuit of the motor 35. The switch is shown in open position in solid lines, Fig. 8, and in closed position in dotted lines. This switch is arranged to be manually operated through a wire 40, connected to and operated from a push button 41, Fig. 9, mounted in the side wall of the cabinet or casing, which button operates a bell crank, as 42. The shaft of the gear mechanism 34 has mounted upon its end a controlling governor mechanism 39, comprising a pair of revolving weighted members 39' adapted to be moved outwardly when under full speed so as to extend a telescoping portion, as indicated in dotted lines. The end of this shaft engages the switch member 38 and holds it in closed position with the circuit of the motor closed. So long as the mechanism is running at full speed the switch is held closed. If for any reason the speed of the gear mechanism 34 is reduced, as by some obstruction or mishap, which places a heavy strain or pull upon the chain through the gear mechanism, the gear mechanism is caused to slow down through a slipping of the belt between it and the motor. This operates the governor 39, which in turn permits the switch to be opened under the tension of its springs 44, thus breaking the circuit and stopping the motor. In order to start the machine, therefore, it is only necessary to press the push buttom 41 which closes the switch mechanism and starts the motor. As soon as the motor and gear mechanism is at full speed, the button can be released, the switch being held in the closed position through the governor mechanism 39, as described. It will be noted from the drawings in Fig. 8 that the main shaft of the gear mechanism A is provided with a worm B, which operates a worm gear C, upon the shaft D, which in turn carries a sprocket E, upon which the driving chain 33 is placed to drive the conveyer chains 4—4, clearly indicated in Fig. 1.

Referring now to Figs. 11 and 12, I have provided a mechanism for regulating or causing the machine to stop, if for any reason one of the card rods should fail to be picked up in the notch of the chain. A rock bar 45 is mounted across the lower end of the machine, as indicated, in Fig. 12, upon brackets 46. Mounted upon each end of this rock bar are two downwardly projecting arms 47—48, which project into the path of the card rods as they move around the pulley 11, Figs. 2 and 12, and into position at 12 to be raised by the trip plate 14 into the next notch in the conveyer chain, as hereinbefore described. Mounted upon the rock bar 45, preferably about the middle thereof is a curved prong, as 49, adapted to rock the bar 45 whenever said prong is raised, and thus lift the arms 47—48 upwardly out of the path of the advancing rods, said prong projecting sufficiently forward so as to accomplish this before the card rod engages the ends of the arms 47—48. If for any reason one end of a card rod, as 50, should fail to enter the notch in the chain by which it is to be carried, it would assume the position indicated in the dotted line position, Fig. 11, and thus escape engagement with the prong 49. The opposite end of the card rod which has advanced, as at 51, engages the arm 48 and causes a check or stopping upon the chain sufficient to cause an operation of the gear mechanism, the pulley of which is held in running engagement with the driving shaft thereof, by a clutch of any desirable construction, designated generally as F, Fig. 8. The increased pull on the sprocket E, through the belt between the motor and the gear mechanism, would cause the clutch F to operate so that the pulley would run upon the shaft, which would cause the governor mechanism 39 to operate and close up and thereby permit the switch 38 to open under the tension of its spring 44, breaking the circuit and stopping the motor and conveyer until the misplaced rod is readjusted and the motor started again.

Referring now to Figs. 14 and 15, also shown in Fig. 3, I have provided means for holding the card rods in the notches of the chain as they are carried thereby when the door of the cabinet or casing is opened. Brackets as 52 are mounted upon the inner side of the casing or cabinet, between which are hinged guard bars, as 53, adapted to project with their edges bearing lightly upon the face of the chain, thereby preventing the card rods 50 coming out of said notches in the conveyer chains 4—4 when the doors of the case or cabinet are opened. These guard rods or members also prevent the chain from vibrating from any cause and assist in keeping the machine in regular and even operation.

While I have shown and described one embodiment of my invention, I am aware that changes can be made therein without departing from the spirit thereof, and I do not, therefore, limit the invention to the particular embodiment, except is so far as the invention may be limited in the broad language of the claims.

I claim:

1. In an advertising machine, a display frame or housing having one or more display fronts or windows, an endless traveling conveyer adapted to receive and carry advertising cards completely around its course of travel and before said display fronts or windows, advertising cards adapted to be carried by said conveyer, means for continuously driving said conveyer, and means for automatically and successively holding said cards momentarily quiet, disconnected from said conveyer, before said display fronts or windows during their travel around the course of said conveyer.

2. In an advertising machine, a display frame or housing having oppositely facing display fronts or windows, an endless traveling conveyer mounted to travel near said fronts or windows and means for driving same, advertising cards adapted to be carried by said conveyer completely around its course of travel and before said display fronts or windows, and means operating automatically to hold said cards successively and momentarily quiet, disconnected from said conveyer, at two different positions before each of said display fronts or windows during their course of travel with said conveyer.

3. In an advertising machine, a display frame or housing having oppositely facing display fronts or windows, an endless traveling conveyer mounted to travel near said fronts or windows and means for driving same, advertising cards adapted to be carried by said conveyer completely around its course and before said display fronts or windows, and means whereby said cards are automatically and successively held momentarily quiet, disconnected from said conveyer, first before one window and then before the other during their travel around the course of said conveyer.

4. In an advertising machine, a display frame or housing having oppositely facing display fronts or windows, an endless traveling conveyer mounted to travel therein near said fronts or windows and means for continuously driving same, advertising cards adapted to be carried by said conveyer around its course of travel and before said display fronts or windows, and means operating automatically to successively receive and hold said cards momentarily quiet both at the bottom and at the top of each of said display fronts or windows during their travel around the course of said conveyer.

5. In an advertising machine, a display frame or housing having one or more display fronts or windows, an endless conveyer and means for driving same, advertising cards adapted to be carried by said conveyer, a supporting rack or magazine adjacent said conveyer and adapted to hold said cards, means coöperating with said conveyer to discharge said cards upon one end of said rack, and means coöperating with said conveyer to pick up said cards at the opposite end of said rack and carry them before said display fronts or windows, said conveyer being arranged to engage and carry said cards upon said rack from one end thereof to the other as it moves along adjacent thereto.

6. In an advertising machine, a display frame or housing having oppositely facing display fronts or windows, traveling conveyers within said frame or housing moving adjacent said fronts or windows and from one to the other, and means for driving same, advertising cards adapted to be carried by said conveyers, a horizontal supporting rack or magazine extending along and adjacent the horizontally moving portions of said conveyers, means coöperating with said conveyers to deposit cards upon one end of said rack, said conveyers being arranged to engage and carry said cards from one end of said rack to the other, and to successively and automatically pick up said cards from the opposite end of said rack and carry them before said display fronts or windows.

7. In an advertising machine, a display frame or housing having one or more display fronts or windows, an endless conveyer and means for driving same, advertising cards adapted to be carried by said conveyer, a pair of supporting racks adjacent said conveyer and adapted to receive said cards, means coöperating with said conveyer to successively deposit said cards upon one end of each of said racks and means coöperating with said conveyer to pick up said cards at the opposite ends of said racks and to carry them successively before said fronts or windows, said conveyer being arranged to engage and move the cards upon one of said racks from one end thereof to the other, and to force the cards along upon the other rack, for the purpose referred to.

8. In an advertising machine, a display frame or housing having display fronts or windows, traveling conveyers therein and means for driving same, said conveyers at points moving in horizontal directions, advertising cards adapted to be carried by said conveyers, upper and lower supporting racks adapted to receive said cards and extending alongside the horizontal portions of said conveyers, means coöperating with said conveyers to automatically and successively deposit said cards at one end of each of said racks and means coöperating with said conveyers to pick up said cards from the opposite ends of said racks as said conveyers move around the course of travel, said conveyers being arranged to engage and carry said cards from the receiving end of one of said racks to the discharging end thereof, and means upon the lower rack for automatically and successively lifting said cards into position to be picked up by said conveyers.

9. In an advertising machine of the character referred to, the combination with the display frame, traveling conveyers and advertising cards, of supporting racks adjacent said conveyers and adapted to receive therefrom said advertising cards, means for adjusting said racks whereby said conveyers engage and carry said cards across said racks, means upon one of said racks operated by said conveyers for automatically and successively lifting said cards into position to be picked up by said conveyers and means upon said conveyers for picking up and carrying said cards.

10. In an advertising machine of the character referred to, the combination with the traveling conveyers, driving mechanism therefor, and advertising cards adapted to be carried thereby, of supporting racks adjacent said conveyers and adapted to receive said cards from said conveyers, means coöperating with said conveyers and said advertising cards for automatically stopping said driving mechanism should one of said cards become displaced.

11. In an advertising machine of the character referred to, the combination with the display frame, conveyers, driving mechanism therefor and advertising cards adapted to be carried by said conveyers, of horizontal supporting racks adjacent portions of said conveyers and adapted to receive advertising cards carried by said conveyers, means coöperating with said conveyers whereby said cards are engaged by said conveyers and moved along in said racks from one end thereof to the other, and means for momentarily disconnecting said cards from said conveyers and holding them quiet for display purposes.

12. In an advertising machine, the combination with a display frame or housing, a traveling conveyer and means for driving same, and advertising cards adapted to be carried by said conveyer, of adjustable horizontal supporting racks adjacent portions of said conveyer and adapted to receive and hold said cards in collected numbers in engaging relationship to the traveling conveyer, and means for delivering said cards successively from said racks to said traveling conveyer for the purpose indicated.

13. In an advertising device comprising a case, a pair of endless advertisement carrying chains, a plurality of advertising sheets suspended between said chains, a continuous running motor operating the chains, and means for stopping said motor on the disarrangement of the advertising sheets.

14. An advertising device comprising a case, a pair of endless advertisement carrying chains, a plurality of advertising sheets suspended between said chains, a continuous running motor operating the chains, and means for automatically stopping said motor on the disarrangement of an advertising sheet.

JOHN FRANK PORTER.

Witnesses:
J. F. REILLY,
E. J. NELSON.

---

Copies of this patent may be obtained for five cents each, by addressing the "Commissioner of Patents, Washington, D. C."